United States Patent
Wu et al.

(10) Patent No.: US 6,415,345 B1
(45) Date of Patent: Jul. 2, 2002

(54) BUS MASTERING INTERFACE CONTROL SYSTEM FOR TRANSFERRING MULTISTREAM DATA OVER A HOST BUS

(75) Inventors: Yung-Jung Wayne Wu, Brampton; James C. Yee, North York; Vladimir F. Giemborek; Stuart J. Lindsay, both of Richmond Hill; Wing-Chi Chow, Toronto, all of (CA)

(73) Assignee: ATI Technologies, Thornhill (CA)

( * ) Notice: Subject to any disclaimer, the term of this patent is extended or adjusted under 35 U.S.C. 154(b) by 0 days.

(21) Appl. No.: 09/128,583

(22) Filed: Aug. 3, 1998

(51) Int. Cl.$^7$ ................................................ G06F 13/00
(52) U.S. Cl. ........................... 710/129; 710/22; 710/52; 710/240
(58) Field of Search ................................ 710/129, 128, 710/126, 100, 52, 62, 7, 22, 20, 240

(56) References Cited

U.S. PATENT DOCUMENTS

| | | | | |
|---|---|---|---|---|
| 5,724,583 A | * | 3/1998 | Carmon et al. | 709/100 |
| 5,905,879 A | * | 5/1999 | Lambrecht | 710/117 |
| 6,088,777 A | * | 7/2000 | Sorber | 711/171 |

* cited by examiner

*Primary Examiner*—Ario Etienne
(74) *Attorney, Agent, or Firm*—Vedder, Price, Kaufman & Kammholz

(57) ABSTRACT

A bus interface control system and method includes an on-demand bus master interface for independently requesting multistream data from host memory without interrupting processing of the host processor between independent requests for data packets. A plurality of digital signal processors share the host bus and utilize flexible data speed transfer depending upon demand of real time data that must be transferred from host memory. The master interface control system includes an packet by packet arbitor to facilitate maximum throughput of data on-demand by the plurality of processing unit.

18 Claims, 5 Drawing Sheets

BUS MASTERING INTERFACE CONTROL SYSTEM FOR TRANSFERRING MULTISTREAM DATA OVER A HOST BUS

CROSS REFERENCE TO RELATED APPLICATION

This application is related to a co-pending application entitled "A Multistream Data Packet Transfer Apparatus and Method", filed on Aug. 7, 1998, by James C. Yee et al., having Ser. No. 09/128,582, owned by instant assignee and hereby incorporated by reference.

BACKGROUND OF THE INVENTION

The invention relates generally to data transfer systems involving transfer of data from one processing unit to a plurality of processing units over a common bus, and more particularly to interface methods and systems that facilitate the interfacing of multiple digital signal processors to another processor wherein the data transferred is multistream data.

Personal computers, work stations and other computers are increasingly incorporating more and more multimedia functions, such as digital video disc players, CD players, TV tuners, modems, and other multimedia components. As a result, computer users can mix digital audio from one audio source such as a DVD player and another audio source such as a CD ROM game. In addition, computer users may be able to receive video or audio information through a modem connection over the Internet while simultaneously playing a movie or mixing audio from other audio sources. The output rate to the audio speakers typically dictates the rate at which data needs to be supplied from the host. In other words, if DVD audio is transmitted at a given rate, real time processing of the audio may require a 48 kilohertz sampling rate of output to speakers connected the multimedia computer system. Multistream audio may need to be processed in real time and output to speakers or other software applications in the system such as when movies are being played.

With some host buses, such as the Intel® PCI bus, a host application typically allocates buffer fragments in system memory to be used in a bus mastering operation. Data is written into these buffers by the host application. The host bus master control program creates a bus master list descriptor table. This descriptor table typically contains an array of bus master list descriptor entries. Each of these entries contains the base address of a buffer, the buffer's size and flags to indicate the end of the circular buffer or the end of the list. In some systems, the host memory can have as many as thirty-two descriptors—one for each stream. The data in the descriptor table also indicates whether the stream must be read or whether it is being written.

A problem arises in such multimedia systems when the same bus is required to transfer data from two sources or two destinations, particularly when some of the data must be processed in real time. Moreover, combining an audio mixing processor on the same chip or circuit board as a digital signal processor for modem processing, can be very expensive if the system utilizes separate bus interfaces for each stream of information. For example, multimedia systems can have sixteen, thirty-two or more audio stream sources connected to a host PC. If some of the audio sources operate at different sampling rates and require real time audio processing, individual bus interfaces between the audio and modem system in the host PC would result in a highly complex and highly costly audio and modem system. For example, where a host processor receives multistreams of audio data from multiple sources such as a DVD and a stored audio file or television tuner, this multistream audio typically has to be processed in real time particularly where for example the audio from the T.V. tuner generating a broadcast of live coverage. Where other processes are also being performed simultaneously, such as modem communication using the host processor, a separate modem processing chip may be incorporated in addition to an audio processing chip wherein both the audio processing chip and the modem processing chip share the common bus to the host processor.

A conventional system may typically only allow either the audio processing chip or modem processing chip to access the bus at a given time, at a fixed rate. Where audio processing is required for example, a digital signal processor may operate at high clock speeds on the order of 100 MHz and may require large bandwidths of throughput to maintain a specified sampling rate for output data to facilitate real time output to speakers or to other further processing blocks. Moreover, the rate at which such a DSP would require data depends upon the type of applications that are in operation. Hence the data throughput demand differs depending upon the applications running on the DSP. Proposed multimedia systems include provision for up to as many as 32 concurrent streams of audio where the streams may be supplied at different sampling rates. In addition, some streams are compressed and require the decompression prior to processing.

A conventional technique for accommodating the varying sampling rates is to provide large buffer memories that are accessible by each of the multiple digital signal processors. However, memory can be prohibitively expensive particularly where high quality and low cost solutions are desired. In addition, it is desirable to avoid frequent interrupts of the host processor to minimize performance degradation particularly when large numbers of multistreams of data must be processed.

Another conventional technique for transferring data from one processor to multiple processors includes the use of a synchronized arbitor that arbitrates between multiple processors on a synchronized basis. However, such systems can become bottlenecks particularly in systems employing multistream data, since real time processing may be desired by one processor but the arbitor may be synchronized to give priority to another processor. Hence such systems may be inflexible in accommodating varying load demands presented by multimedia systems. In addition, such systems typically utilize dual ported memory such that both a primary or host processor and another processor can access the same memory. Such dual ported memory configurations can increase the cost of the system.

Other known techniques for transferring data from a host processor to a plurality of other processors on the same bus include treating the peripheral processors as slaves such that numerous interrupts must be sent to the host processor to notify the host processor to transfer or receive data from the slave digital signal processors. Such a configuration can unnecessarily slow down the operation of the overall system by introducing unnecessary interrupts particularly where real time multistream data is being transferred over the bus.

Consequently there exists a need for a host interface control system for transferring data over a host bus when a host processor shares a bus with a plurality of other digital signal processors, such as those that may process the data in real time.

DETAILED DESCRIPTION OF THE INVENTION

Figure 1:
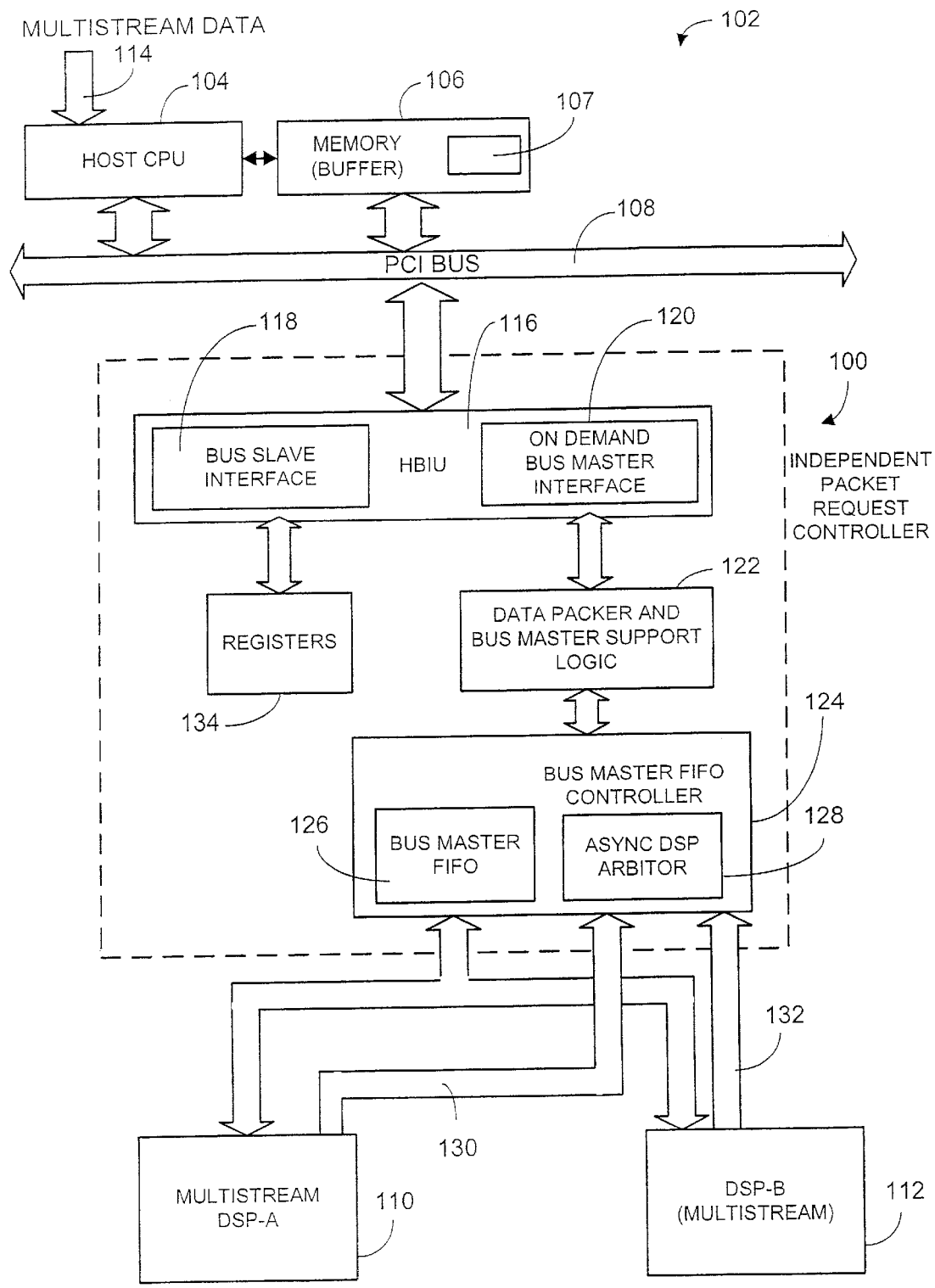
FIG. 1 is a block diagram showing one embodiment of a bus interface control system to facilitate multistream processing in accordance with one embodiment of the invention.

A bus interface control system and method includes an on-demand bus master interface for independently requesting multistream data from host memory without interrupting processing of the host processor between independent requests for data packets. A plurality of digital signal processors share the host bus and utilize flexible data speed transfer depending upon demand of real time data that must be transferred from host memory. The system includes a flexible stream register assignment for both source and destination use. Any register may be used for any one stream. A bank of assignable registers are used to access fragmented memory by requesting stream data transfer in variable packet sizes that are independent of fragmented memory sizes based on the stream configuration data. A controller programs the bank of registers to allocate a single register for one stream at any given time and programs bus master stream identification registers with descriptor table address location and size information. Storage of descriptor table information for each stream is used in the memory access system, such as pointers indicating a next fragmented buffer entry and size of buffer memory for a given stream. The transfer size of audio stream information, e.g., size of variable sized data packets, is independent of the size of fragmented buffers.

The variable data packet sizes are determined by the digital signal processors and may be shorter than the buffer length. A data packer evaluates received bus data and removes unused bytes and packs only valid data in fixed sized units to form a packet for efficient use by the plurality of multistream processing units. The multistream data may be a plurality of audio streams sampled at differing sampling rates. The multistream processing units are coupled to a master interface controller to obtain data from host memory over the shared bus at variable rates.

By using smaller data packets, more frequent interrupts occur for the plurality of multistream processing units instead of the host processor. As a result, infrequent interrupts to the host are generated by the disclosed system. The master interface control system maintains multistream status information, such as pointers representing descriptor table data associated with a fragmented host buffer. The master interface controller also includes multistream data packet FIFO memory and FIFO memory control logic to facilitate multistream data packet communication between the plurality of multistream processors and the master interface controller. In addition, the master interface controller includes an arbitor connected to the plurality of multistream processors for asynchronously arbitrating storage of the variable data packets in the data packet FIFO memory. This is done on a per packet basis.

In one embodiment, the plurality of multistream processing units include an audio digital signal processor and modem communication digital signal processor to facilitate real time processing of audio data for movies as well as accommodating modem communications. Memory access is made if needed, by hopping between fragmented memory sections to obtain stream data for a given stream such that if stream data stored by the host is in nonsequential fragmented memory locations, the system will automatically hop between the fragmented memory sections to obtain the necessary stream information to facilitate real time processing of the designated stream.

FIG. 1 shows an example of one embodiment of an on-demand bus master interface controller 100 used in a multimedia computer system 102. The multimedia computer system 102 includes, for example, a host central processing unit (CPU) 104 and host buffer memory 106 such as memory having data stored in fragmented locations. The host CPU 104 and the host buffer 106 are coupled to a host bus 108, such as a PCI bus or other suitable bus. As known in the art, the host CPU stores the multistream data in memory buffers in independent sizes depending upon the availability of host memory and the requirements of the program currently executing. The host bus 108 is shared by a plurality of multistream digital signal processing units 110 and 112, such as digital signal processors for processing multistream data stream packets transferred over the host bus 108. The on-demand bus master interface controller 100 independently requests multistream data from the buffer 106 in variable length multistream data packets without interrupting processing by the host processor 104 between independent requests for data packets. Preferably, the variable length multistream data packets are shorter than the fragmented buffer length for any given stream of data. The host CPU 104 receives multistream data 114 from a number of multistream data sources such as DVD players, CDROMS, T.V. tuners or other sources. The multistream data may be continuous streams of audio and video information that must be processed, for example, in real time. The multistream data may include any number of streams such as thirty-two streams of data that must be processed by multistream processing units 110 and 112.

The multistream processing unit 110 may be a digital signal processor dedicated for processing continuous streams of multistream audio wherein the multistream audio is coming from the multistream sources at different sampling rates. The multistream processing unit 112 may be a digital signal processing unit primarily dedicated to handling modem communication information, such as for example AC97 CODEC information.

The on-demand bus master interface control system 100 serves, among other functions, as an independent packet request controller. On-demand bus master interface control system 100 includes a host bus interface unit 116 which includes a bus slave interface unit 118 and an on-demand bus master interface 120. The on-demand bus master interface control system 100 also includes bus master support logic and data packer 122 which is coupled to the on-demand bus master interface 120 and to a bus master FIFO controller 124.

The bus master FIFO controller 124 includes a bus master FIFO 126 and an asynchronous multistream arbitor 128. The plurality of multistream processing units 110 and 112 can access the bus master FIFO 126. The multistream processing units 110 and 112 also generate bus master requests to the asynchronous arbitor 128 through bus 130 and 132.

As known in the art, the host CPU stores the multistream data in memory buffers in independent sizes depending upon the availability of host memory. In contrast to known systems, the host bus interface unit 116 accesses multiple fragmented buffers, if necessary, to obtain a variable length multistream packet that is shorter than the length of the group of fragmented buffers dedicated to a given data stream. The host bus interface unit 116, through the on-demand bus master interface 120, transfers multistream variable sized data packets between the host buffer 106 and the multistream processors 110 and 112. The host bus interface unit 116 reads stream-specific data stored in stream data registers in the data packer and bus master support logic 122 prior to each packet transfer. It does so in order to resynchronize to the exact point where the last packet transfer for this stream left off The host bus interface unit 116 obtains a pointer to the descriptor table 107 for that particular stream, a pointer to a specific fragmented host buffer 106 and a count value indicating how many bytes are left in that fragmented buffer. As the present packet is being transferred, the host bus interface unit 116 keeps track of where in the fragmented host buffer 106 multistream data packets have been read from or were written to by accessing a host stored descriptor table (see FIG. 3) each transfer. The data packer and bus master support logic 122, through the host bus interface unit 116, may notify the host CPU that the host buffer is clear by sending an interrupt. In addition, the host bus interface unit 116 tracks the amount of data transferred in the host buffer 106, which buffer location and where within the buffer the data has been obtained. This data is sent to the data packer and bus master support logic 122 and is stored therein at the termination of each packet transfer. After the packet has been transferred, the host bus interface unit 116 stores the new pointer to the descriptor table, the new pointer to the fragmented host buffers and the new count value representing the number of bytes left to transfer in the buffer referenced by the new pointer to the fragmented host buffers in the data packer and bus master support logic 122. The length of each variable sized packet is determined by the amount of data required by a given DSP at a particular time and is limited by the FIFO size.

The multistream data packet bus master FIFO memory 126 is controlled by bus master FIFO controller 124 to facilitate transfer of multistream data packets between the multistream processing units 110 and 112 and the host bus interface unit 116.

Figure 2A:
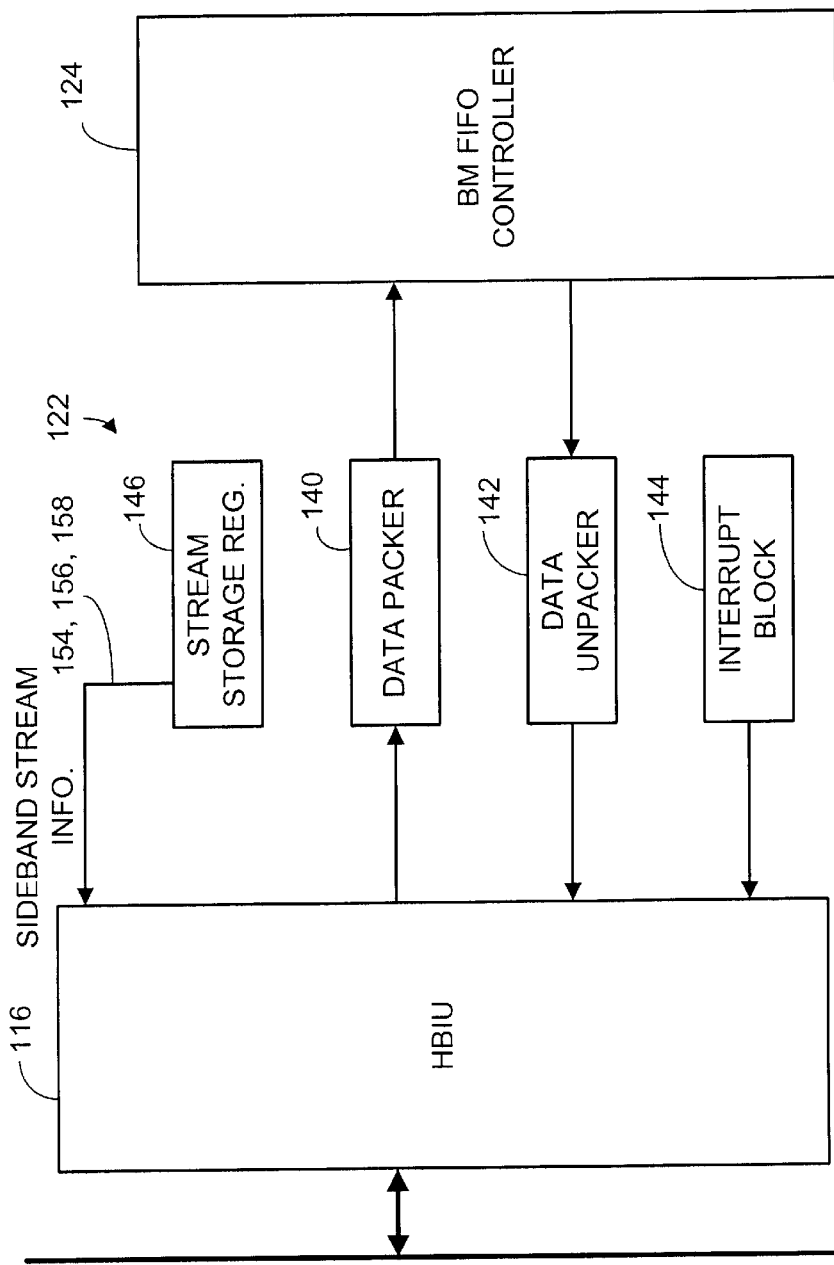
FIG. 2a is a block diagram illustrating a data packer/unpacker in accordance with one embodiment of the invention.

Referring to FIG. 2a, the data packer and bus master support logic 122 contains a bank of assignable registers corresponding to the required storage to support up to thirty two simultaneous data streams. The data packer and bus master support logic 122 includes a data packer 140 that packs the bus master DSP FIFO 126 with downstream data (bus master read from fragmented memory) using fixed unit sizes, such as four bytes per unit. A data unpacker 142 unpacks upstream data (bus master writes) so that bulk data transfer through the on demand bus master interface 120 is at a maximum bandwidth, regardless of the byte alignment or length of the fragmented buffers in host (system) memory. The data packer 140 and data unpacker 142 allow the DSPs 110 and 112 to transfer variable sized packets (such as double word sized packets) regardless of how fragmented the host buffer may be, with little or no overhead from the DSP.

Several formats of eight bit and sixteen bit samples are selectable through select bits associated with the data packer 140. The fixed units packed by the data packer 140 in the bus master FIFO 124 is preferably four bytes, however, it will be recognized by those of ordinary skill in the art, that any suitable fixed length may be used. The data packer 140 and unpacker 142 only packs/unpacks usable data for/from the DSP requesting the data for a particular stream. The host CPU may allocate stream-related data into buffer fragments 106 that are non-double-word aligned (starting address is not a multiple of four bytes) and whose buffer-sizes are not a multiple of four bytes. However, some bus protocols, PCI for example, are obliged to transfer data in groups of double-words (four bytes) where the address of the first byte must be double-word aligned. When transferring non-double-word aligned buffers, the first and (likely) the last transfers for a particular fragment will contain data that are un-used or in-valid. In the case of PCI buses, the protocol always indicates which bytes among the four in the double-word are valid via "byte-enable" data. The on demand bus master interface 120 passes on this information to the data packer 140 and unpacker 142 which uses this information so that for bus master reads, only valid data is placed in the bus master FIFO 126 and for bus master writes, only the appropriate number of bytes are taken from the bus master FIFO 126 for each host transfer. "Padding" bytes are inserted in the appropriate byte slots as mandated by the "byte enable" data. Thus, the DSPs need not worry about invalid data for reads and padding unused byte slots for writes. As such, the data packer and unpacker scatters and gathers data "hops" among fragmented memory locations without requiring the data to be stored in fragmented memory that are double-word aligned.

Figure 2B:
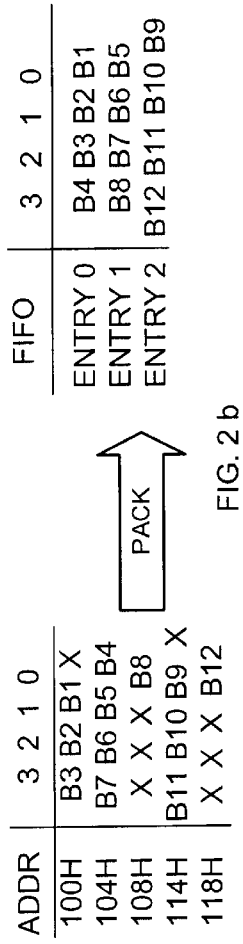
FIG. 2b is a diagram illustrating an example of data packing.

FIG. 2b shows, by way of example, fragmented host buffers having addresses 100H–108H and 104H–108H having various bytes B1–B12 stored therein. The "X" represents unusable data sent by the host CPU as part of a fixed double word. The data packer and bus master support logic 122 packs, or maps, data B1–B4 from differing addresses into a common FIFO entry, data B5–B8 from differing addresses (buffers) into another sequential common FIFO entry and so on, to pack the data from fragmented memory into small fixed sized full entries that may be grouped in double words in the 32 bit bus master FIFO 126 for use by the DSP's. Conversely, for bus master writes, the data unpacker 142 unpacks the packed bus master FIFO entries to conform with the size and location within each double word of each host transfer. For unfragmented memory, each host transfer may typically involve four bytes. For severely fragmented memory, each host transfer may be one, two, three, or four bytes, where one byte can be non word aligned. The degree of fragmentation is transparent to the DSP's. In PCI-based systems, each double-word entry in the FIFO 126 may be required to be transferred over one to four PCI bus master write cycles, depending upon the degree of fragmentation and byte-alignment of buffers in 149. The data unpacker allows the host bus interface unit 116 to bus master at byte-level granularity to satisfy any degree of fragmentation.

Figure 3:
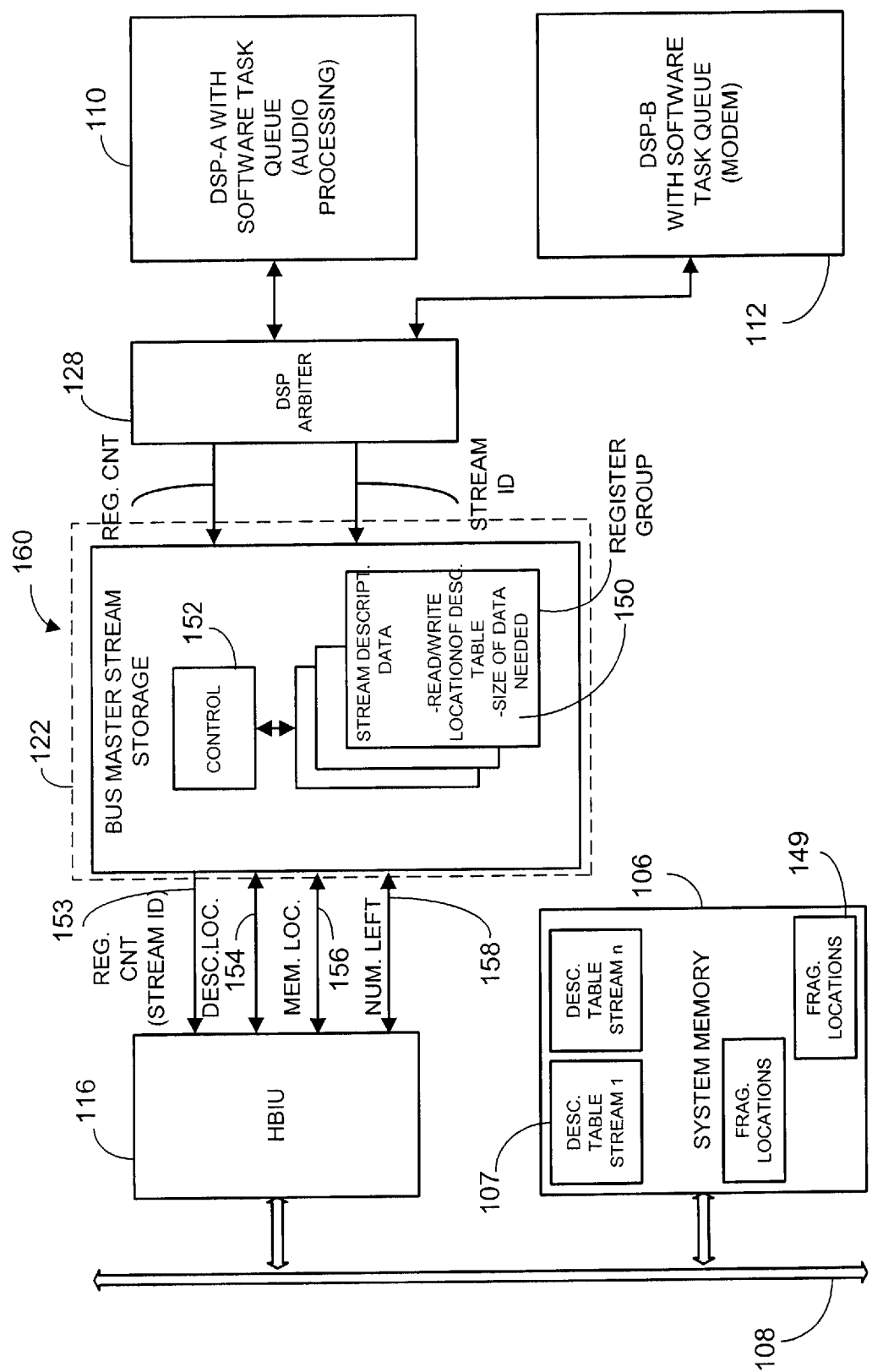
FIG. 3 is a block diagram illustrating one embodiment of bus master registers for facilitating bus mastering in accordance with one embodiment of the invention.

Referring to FIG. 3, the stream storage registers 146 are a bank of assignable registers that store data representing pointers to fragmented memory locations 149 and store remaining size data of each partially consumed memory fragment as stream descriptor data 150 for each stream of multistream data. The stream descriptor data 150 includes data that tracks the progress of up to 32 active streams. For each active stream, up-to-date pointers to the stream's descriptor table and last unfinished buffer fragment as well a counter representing the number of bytes left in the buffer fragment is maintained. This "up-to-date" information is based on the information provided by the host bus interface unit 116 at the end of the last packet transferred for that stream. The sideband signals 154, 156 and 158 are the means by which the above information is transferred between the host bus interface unit 116 and the stream storage registers 146. The control block 152 sequences the above information transfer. At the beginning of the next packet transfer for this stream, the control block 152 sequences the flow of information in the opposite direction over the sideband signals 154, 156 and 158 so that the host bus interface unit 116 can resume transfer of data for that stream seamlessly.

The information from the bus master stream storage registers 146 to the HBIU 116 includes among other things, register count, or stream ID data 153, descriptor table location data 154 indicating an address of the where the table is located in system memory and the particular offset in the table, fragment memory location data 156 indicating the particular buffer fragment being processed, and data representing the number of bytes left in the host buffer for a given data stream 158. The table contains addresses of the beginning of each fragment.

Register bank 160 includes groups of stream registers that identify the location of each stream descriptor table. For each stream, one register in the group contains the memory address for the current entry 154 in the descriptor table, and the size of the descriptor table. The register may be used to contain data representing the direction of transfer from system memory or to system memory and may control byte-level shuffling in the packing and unpacking circuitry so that eight bit, sixteen bit and 32-bit sample data can be supported for differing host processors. For example, if one stream is represented by 8-bit samples whose origins/destination can be traced back to a big-endian microprocessor and another stream is represented by 16-bit samples whose origins/destination can be traced back to a little-endian micro-processor, conversion may be accommodated on a per stream basis so that all streams are converted to a common big-endian or little-endian format to the DSPs. The second register also includes data representing whether the stream is cancelled and a number of bytes left 158 in the stream buffer. A third register includes the pointer 156 to the current location in the buffer so that when the present packet for the stream has been transferred, another stream may be processed by the DSP and the DSP may come back and continue to process the first stream. Preferably, the maximum packet length is 256 bytes. However any suitable length may be used if desired. It will be recognized, that the packet size may be limited by the FIFO size.

Accordingly, a pointer to the descriptor table and a pointer to a present unfinished buffer fragment for each stream is included as data in the bank of registers 160. A register group is dedicated for each steam, so that if for example, thirty-two streams of multistream audio are anticipated, thirty-two register groups may be used as previously mentioned. The bus master interface 120 obtains and maintains multistream status information from the host memory descriptor tables and stores the information in the data packer and bus master support logic 122 at the termination of each packet transfer so that the requisite pointer data is updated. The bus master interface controller through the on-demand bus interface stores bus master stream identification description data, bus master stream specific count data, bus master identification buffer location data and bus master stream identification request latch information using the data packer and bus master support logic 122.

The system serves as an asynchronous bus mastering system that arbitrates among multiple data streams in both directions to facilitate concurrent multistream data processing for one or more digital signal processors. In addition, there is no interrupt for every bus master transfer thereby reducing interrupts to the host and improving overall performance when processing multistreams. The packet size is independent of the fragmented buffers to allow real time processing of multiple streams of data.

Referring back to FIG. 2a, the bus master interface 120 generates an interrupt using interrupt block 144 for the host when: the end of a stream is indicated from one of the plurality of digital signal processors 110 and 112; when the host buffer memory is emptied for a stream that has been sent to one of the plurality of multistream processing units 110 and 112; when host memory buffers in memory 106 are full for streams that have been sent from one or more of the plurality of multistream processing units 110 and 112; and when a cancellation data is generated for a current stream of data.

The asynchronous DSP arbitor 128 arbitrates access between the two multistream data processing units 110 and 112 in an asynchronous manner. The multistream data processors are not synchronized and require different amounts of data from different multistreams at different times depending upon the application being active at any one time. For example, where modem communication is occurring at the same time as the playing of a digital video disk or the mixing of multiple audio streams, both the multistream processing unit 110 and the multistream processing unit 112 will require data from the host buffer 106. However, the rates at which the DSPs 110 and 112 require the information is likely to be very different. Moreover the source of the multistream data may also dictate the rate at which information may be processed by the multistream data processing units 110 and 112.

Figure 4:
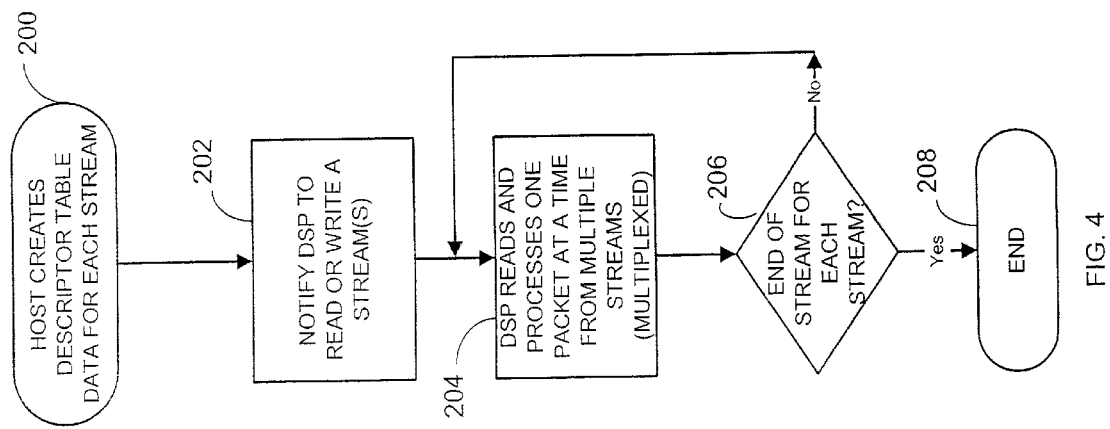
FIG. 4 is a flowchart generally depicting the operation of the system FIG. 1.

FIG. 4 is a flow diagram showing generally the operation of the on-demand bus interface control system 100 as applied to a multimedia system such as that shown in FIG. 1. The process starts in block 200 wherein the host CPU 104 creates descriptor table data for each stream as known in the art. This descriptor table data as previously described, is stored in host memory 106. Under control of an audio processing program or modem communication program, the host processor notifies one or both of the DSPs 110 and 112 to read or write a stream or streams of data as shown in block 202. The notification commands to the DSP occur through bus 108 using the bus slave interface 118. The bus slave interface 118 stores the notification request in register 134. The notification registers are for each of the plurality of multistream data processing units 110 and 112. A selected multistream processing unit 110 or 112 reads and processes a multistream data packet one at a time from multistreams of data as shown in block 204. For example, if multistreams are processed by a single digital signal processor, the digital signal processor obtains multistream packet data through the master interface control system 100 one packet at a time for a plurality of multistreams. If the end of a stream has been reached for each stream as indicated in block 206, then the DSP has completed its task of generating interrupts to the on-demand bus master controller 100 to obtain the necessary information as it required. If the end of the stream has not been reached for each stream, the DSP continues to process one packet at a time for each of the multiple streams until all streams have been terminated by the host CPU. The DSP then waits for another notification signal to read or write a stream from the host as indicated in block 208. When the DSP requires information, the on-demand bus master control system 100 generates a bus master request based on the bus master request from a given DSP 110 or 112.

Figure 5:
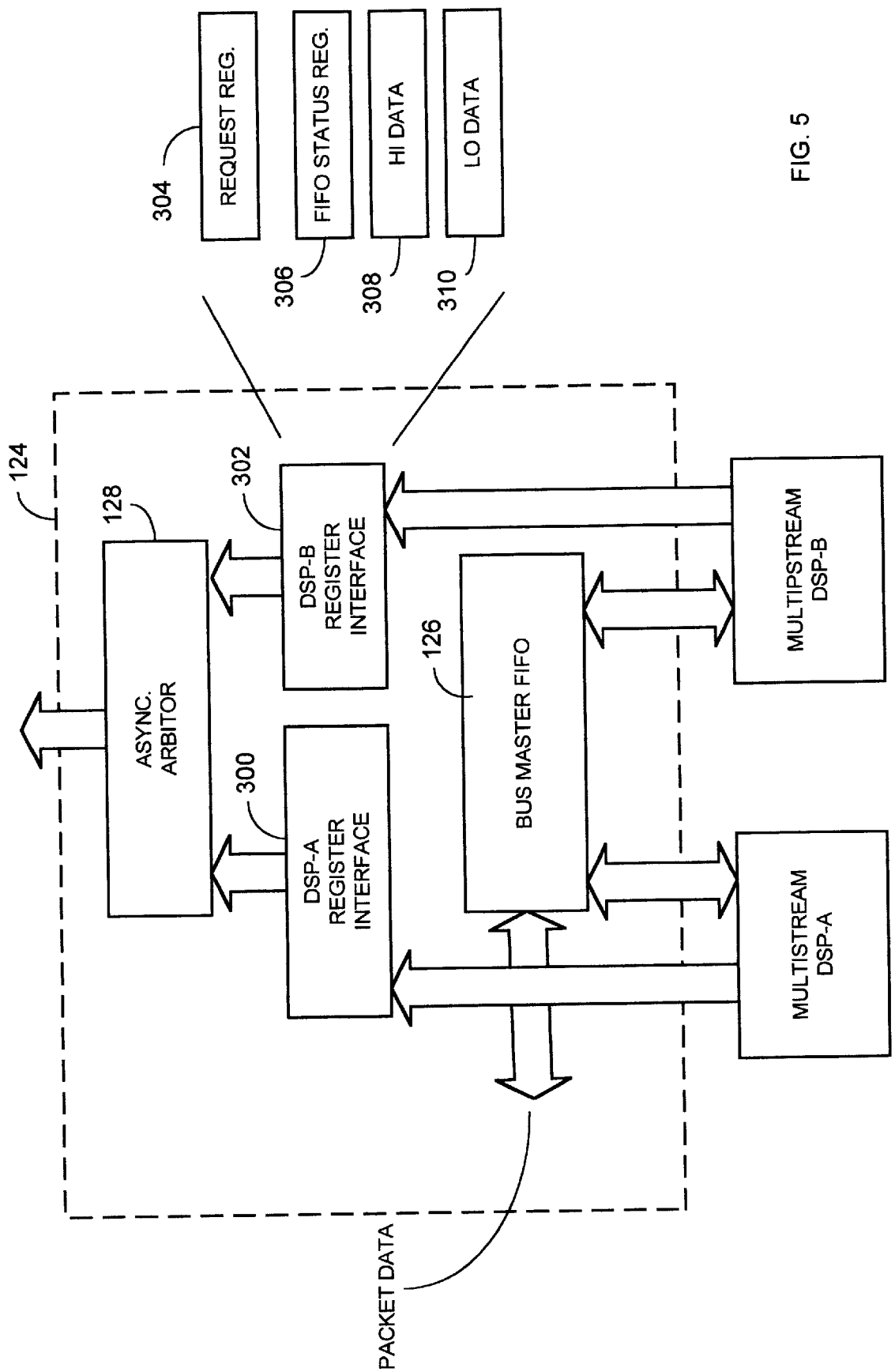
FIG. 5 is a block diagram depicting one embodiment of a bus master FIFO controller in accordance with one embodiment of the invention.

FIG. 5 shows in more detail an example of one embodiment of a bus master FIFO controller 124 having an asynchronous arbitor 128. The asynchronous arbitor 128 performs real time arbitration on a per packet basis between the multistream processing units 110 and 112. Preferably this is performed in a round robin manner on a per clock basis such that data transfer to the bus master FIFO controller 124 is alternated from one DSP to the other DSP each clock cycle. Arbitration begins when the BM FIFO is empty and ends when a DSP sets a request bit in a bus master request register. If the request is a read request, the FIFO controller interrupts the DSP only after receiving notification from the on demand bus master interface 120. Hence the bus master FIFO controller selectively attempts to equalize access to and from the host for each of the digital signal processors 110 and 112.

The bus master FIFO controller 124 also includes DSP register interfaces 300 and 302 for each of the digital signal processors 110 and 112. Each DSP register interface 300 and 302 includes a request register 304, a FIFO status register 306, a hi-data register 308 and lo-data register 310 each of which may any suitable length, with a 24 bit DSP data bus, a 24 bit length may be used. The request register 304 is preferably write only and contains data representing a number of bytes to transfer (either read from or write to) for the DSP with a maximum of 256 bytes in a transfer. The request register 304 also includes a write cancel bit to allow a DSP to stop a DSP write such as to notify the host that an end of stream has occurred when writing to host memory 106. The request register 304 includes a write register containing data representing a number of bytes in a data packet stored in the data packet FIFO that is to be independently transferred to the buffer. The request register also includes data representing data stream identification data for thirty two streams identifying a multistream that the bytes belong to. Referring back to FIG. 3, the controller 152 in the bus master support logic and data packer 122 uses the data stream identification data from the request register 304 in order to select the appropriate stream information to be sent on the sideband signals 154, 156 and 158.

The FIFO status register 306 is preferably a read only register and is read by the DSP when an interrupt for the DSP occurs. The FIFO status register includes bits representing the number of bytes present in the bus master FIFO 126 received from host memory 106. The FIFO status register 306 also includes bits representing an end of stream received from the host 104 and also includes bits representing a grant of access bit which generates an interrupt to the DSP from the on-demand bus master interface 120.

The hi-data and lo-data registers facilitate word size conversion and include two 16 bit registers to interface with the bus master FIFO which is a 32 bit word. The bus master controller sends the contents of the hi-low registers 308 and 310 to the FIFO when the lo register is filled.

Figure 6:
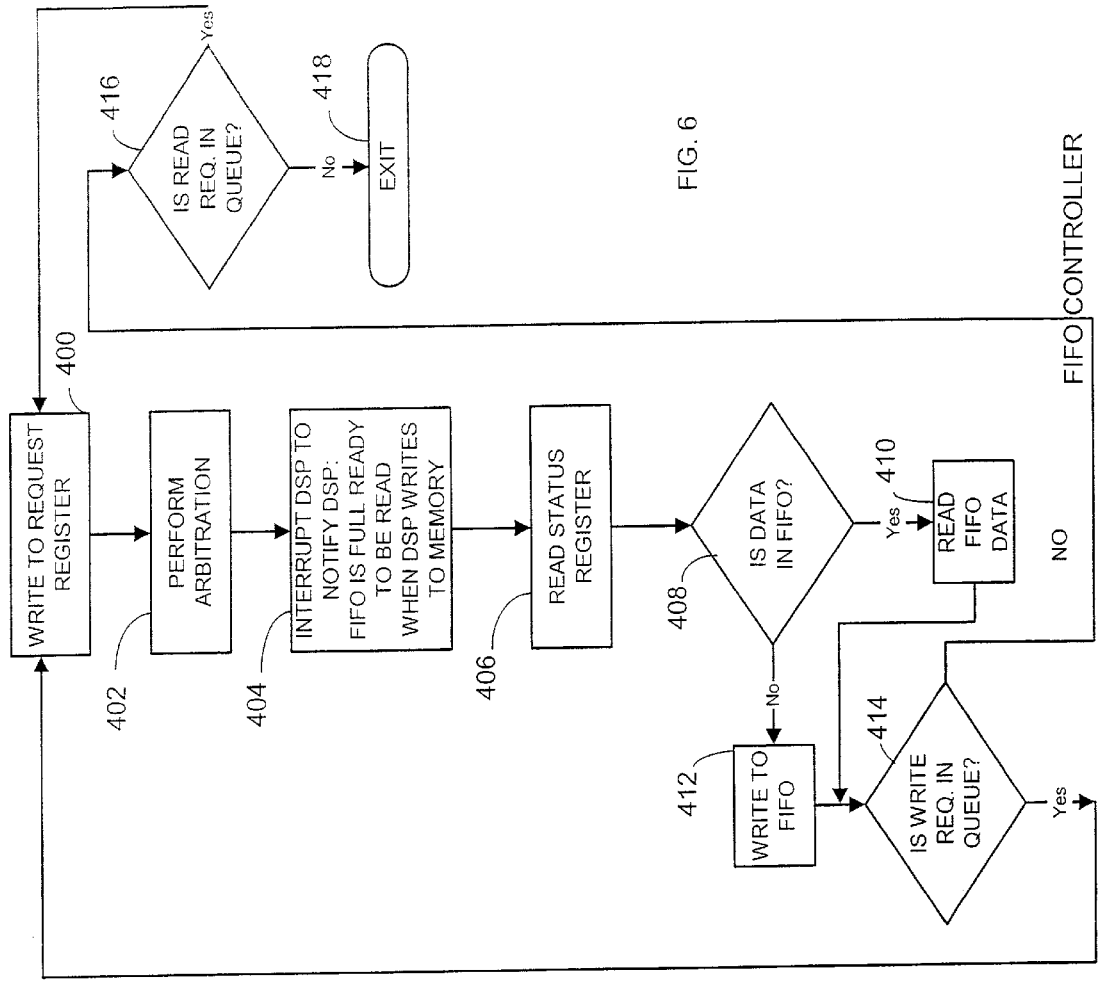
FIG. 6 is a flow chart depicting one example of operation of a FIFO controller in accordance with one embodiment of the invention.

FIG. 6 is a flowchart indicating a method of operation of the bus master FIFO controller 124. This is a more detailed flow diagram of the method that occurs in block 204 from FIG. 4. The bus master FIFO controller may be a combination of a software program executing on both DSP's and hardware. However, it will be recognized it may implemented in any manner including hardware if desired. For either of the DSPs to read and process one packet at a time for multistreams, the DSP writes to its corresponding request register 304 as shown in block 400. The non synchronous arbitor 128 performs arbitration between the two DSPs as shown in block 402. This is done by alternating between DSP write and/or read requests in a round robin manner. The FIFO controller 124 generates an interrupt to the DSP to notify the DSP when the FIFO is full and ready to be read and also interrupts the DSP when the DSP needs to write to the FIFO. This is shown in block 404. The DSP notifies the bus master FIFO controller that a write-to memory must occur by sending a bus master request. The FIFO controller reads the FIFO status register 306 to determine the status of the FIFO. This is shown in block 406. The FIFO controller 124 determines whether there is multistream packet data in the bus master FIFO as shown in block 408. If there is data in the FIFO for the given stream, the bus master FIFO controller reads the FIFO data as shown in block 410. If the data is not in the FIFO, the FIFO controller writes to the FIFO as shown in block 412. As shown in block 414, the FIFO controller 124 determines whether there is a write request in the command queue of the DSP. If there is a write request in the queue, the DSP writes the bus master request to the request register as shown block 400. If no write request is in the queue, the bus master FIFO controller 124 determines if there is a read request in a software maintained queue. If there is a read request in the queue, a read request is sent to the request register as shown in block 416. If there is no write request or read request in queue, the FIFO controller exists the queue analysis routine, as shown in block 418.

The digital signal processors 110 and 112 request the multistream data from the buffer as variable length data packets on-demand without interrupting processing by the host processor between independent requests for the data packets.

The FIFO status register 306 which also includes a data packet FIFO read status register containing at least data representing a number of bytes in the data packet FIFO received from the buffer and also data representing an end of stream as received from the host processor. The FIFO status register is read by a DSP in response to an interrupt generated by the bus master interface when transfer of the multistream data packet from the buffer is complete.

The FIFO memory stores a data pack for each of the different multistreams in a packet by packet basis to facilitate multitasking by the digital signal processor, in this way, a digital processor can obtain different streams of data on a packet by packet basis, on a as needed basis without unnecessarily interrupting the host processor. In addition, the bus master interface control system tracks the amount of data transfer with the host buffer and also tracks which of the host buffers is remaining and the address location of the remaining data to be transferred within the host buffer.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A bus interface control system for transferring data over a host bus operatively coupled to at least one host processor wherein the host processor receives multistream data and stores the received multistream data in a fragmented buffer, comprising:

first multistream processor for processing multistream data packets transferred over the host bus; and master interface mans, operatively coupled to the first multistream processor and the buffer, for independently requesting the multistream data from the fragmented buffer in variable data packet sizes that are independent of fragmented memory sizes without requesting host processor intervention between requests for data packets.

2. The bus interface control system of claim 1 including means for storing data representing fragmented memory locations and for storing a size of each memory fragment as part of stream description data for at least one stream of the multistream data; and means, responsive to the stream description data, for periodically programming stream configuration data based on the stream descriptor data in stream configuration data storage designated for each stream.

3. The bus interface control system of claim 1 wherein the master interface means for independently requesting the multistream data further includes:

multistream data packet FIFO memory; and means, operatively coupled to the multistream data packet FIFO memory, for controlling the data packet FIFO memory to facilitate transfer of multistream data packets between the first multistream processor and the means for transferring.

4. The bus interface control system of claim 2 further including a second multistream processor for processing multistream data packets transferred over the host bus and wherein the master interface means further includes an arbitor operatively coupled to the first and second multistream processors for asynchronously arbitrating storage of data packets in a data packet FIFO memory, on a per data packet basis, between the first and second multistream processors.

5. The bus interface control system of claim 3 wherein the means for controlling the data packet FIFO includes a write request register containing at least data representing a number of bytes in a data packet stored in the data packet FIFO to independently transfer to the buffer, and data stream identification data identifying the multistream the bytes belong to.

6. The bus interface control system of claim 4 wherein the buffer is in host memory, the multistream data includes multiple streams of digital audio data and the first and second multistream processors are digital signal processors that request the multistream data from the buffer as variable length data packets on-demand without interrupting processing by the host processor between independent requests for data packets.

7. The bus interface control system of claim 5 wherein the means for controlling the data packet FIFO further includes a data packet FIFO read status register containing at least data representing a number of bytes in the data packet FIFO received from the buffer, and data representing an end of stream as received from the host processor.

8. The bus interface control system of claim 3 wherein the FIFO memory stores a data packet from each of the different streams on a packet by packet basis to facilitate multitasking by a digital signal processor (DSP) operatively coupled to the bus interface control system.

9. The bus interface control system of claim 1 wherein the master bus interface includes means for hopping among designated fragmented memory sections on a per stream basis to obtain stream data for each stream.

10. The bus interface control system of claim 1 wherein the master bus interface dynamically updates stream description data after each transfer.

11. The bus interface control system of claim 1 including bus master stream identification registers as a bank of registers for each stream.

12. A bus interface control system for transferring data over a host bus operatively coupled to at least one host processor that receives multistream data, for storing the received multistream data in a fragmented buffer, comprising:

first multistream processor for processing multistream data packets transferred over the host bus;

at least a second multistream processor for processing multistream data packets transferred over the host bus; and master interface means, operatively coupled to the first and second multistream processors and the buffer, for independently requesting the multistream data from the fragmented buffer in variable data packet sizes that are independent of fragmented memory sizes without requesting host processor intervention between requests for data packets wherein the master interface means further includes:

an arbitor operatively coupled to the first and second multistream processors for arbitrating storage of data packets, on a per data packet basis, between the first and second multistream processors;

multistream data packet FIFO memory, operatively coupled to the arbitor, for storing the data packets; and means, operatively coupled to the multistream data packet FIFO memory, for controlling the data packet FIFO to facilitate transfer of multistream data packets between the first and second multistream processors and the buffer.

13. The bus interface control system of claim 12 wherein the means for controlling the data packet FIFO includes a write request register containing at least data representing a number of bytes in a data packet stored in the data packet FIFO to independently transfer to the buffer, and data stream identification data identifying the multistream the bytes belong to.

14. The bus interface control system of claim 13 wherein the buffer is in host memory, the multistream data includes multiple streams of digital audio data and the first and second multistream processors are digital signal processors that request the multistream data from the buffer as variable length data packets on-demand without interrupting processing by the host processor between independent requests for data packets.

15. The bus interface control system of claim 14 wherein the means for controlling the data packet FIFO further includes a data packet FIFO read status register containing at least data representing a number of bytes in the data packet FIFO received from the buffer, and data representing an end of stream as received from the host processor.

16. A method for controlling transfer of data over a host bus operatively coupled to at least one host processor that receives multistream data, for storing the received multistream data in a fragmented buffer comprising the steps of:

processing, by a first multistream processor, multistream data packets transferred over the host bus; and independently requesting the multistream data from the fragmented buffer in variable data packet sizes that are independent of fragmented memory sizes without requesting host processor intervention between requests for data packets.

17. The method of claim 16 including the step of processing, by a second multistream processor, multistream data packets transferred over the host bus and including the step of arbitrating storage of data packets using a data packet FIFO memory, on a per data packet basis, between the first and second multistream processors.

18. The method of claim 17 wherein the buffer is in host memory, the multistream data includes multiple streams of digital audio data and the first and second multistream processors are digital signal processors that request the multistream data from the buffer as variable length data packets on-demand without interrupting processing by the host processor between independent requests for data packets.

* * * * *